United States Patent
Krimmel

[11] Patent Number: 6,006,066
[45] Date of Patent: *Dec. 21, 1999

[54] TRANSMISSION SYSTEM WITH TAP DEVICES WHICH REDUCE THE EFFECTS OF INTERFERENCE

[75] Inventor: Heinz Krimmel, Korntal-Münchingen, Germany

[73] Assignee: Alcatel N.V., Rijswijk, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/724,183

[22] Filed: Sep. 30, 1996

[30] Foreign Application Priority Data

Sep. 30, 1995 [DE] Germany ............... 195 36 682

[51] Int. Cl.⁶ ................................................ H04N 7/173
[52] U.S. Cl. ................................... 455/5.1; 348/12
[58] Field of Search ..................... 455/5.1, 3.1, 6.1, 455/3.2, 4.1, 4.2, 6.2; 348/12, 13, 7, 192; H04N 7/16, 7/10, 7/173

[56] References Cited

U.S. PATENT DOCUMENTS

| | | |
|---|---|---|
| Re. 31,639 | 7/1984 | Nicholson ............................ 455/5.1 |
| 3,750,022 | 7/1973 | Curry et al. . |
| 3,835,393 | 9/1974 | Marron ................................ 455/5.1 |
| 3,924,187 | 12/1975 | Dormans . |
| 4,633,202 | 12/1986 | Basile et al. ........................ 455/5.1 |
| 4,633,462 | 12/1986 | Stifle et al. ......................... 455/5.1 |
| 5,361,394 | 11/1994 | Shigihara . |
| 5,390,337 | 2/1995 | Jelinek ................................ 455/5.1 |
| 5,488,413 | 1/1996 | Elder et al. ......................... 455/5.1 |
| 5,799,239 | 8/1998 | Gough et al. ....................... 348/12 |
| 5,819,159 | 10/1998 | Dail ..................................... 348/12 |
| 5,835,844 | 11/1998 | Stoneback et al. ................ 348/12 |

FOREIGN PATENT DOCUMENTS

| | | |
|---|---|---|
| 1336340 | 7/1995 | Canada . |
| 2697118 | 4/1994 | France . |

OTHER PUBLICATIONS

Patent Abstracts of Japan, vol. 009, No. 159 (E–326), Jul. 4, 1985 & JP 60 037839 A (Deietsukusu Antena KK), Feb. 27, 1985.

*Primary Examiner*—Chris Grant
*Attorney, Agent, or Firm*—Ware, Fressola, Van Der Sluys & Adolphson LLP

[57] ABSTRACT

A transmission system with a number of tap devices (1), which are connected to a distribution network (9). Subscriber terminals (11) can be connected to each tap device (1) present in a building (10), by means of a private, in-house network (13); these terminals can send upstream signals (AUF) to a center (8). A tap device (1) has first means (4, 5, 6) which attenuate an upstream signal (AUF) supplied to a second port (3) with a specified attenuation factor (a) and send it to the first port (2). The upstream signal (AUF) is sent out by a subscriber terminal (11) with a signal level which is selected so that after the attenuation, the upstream signal (AUF) has a level specified in the distribution network (9).

8 Claims, 2 Drawing Sheets

TRANSMISSION SYSTEM WITH TAP DEVICES WHICH REDUCE THE EFFECTS OF INTERFERENCE

TECHNICAL FIELD

The invention pertains to an electronic transmission system such as a broadband distribution network wherein a center is connected to a distribution network having a plurality of tap devices each connected to the distribution network by a first port, and wherein subscriber terminals can be connected to each of the tap devices via a second port, said subscriber terminals being capable of receiving signals from the center and transmitting upstream signals to the center. In addition, the invention pertains to a tap device for a transmission system of this kind and to a device for directional attenuation of signals.

BACKGROUND OF THE INVENTION

A transmission system, for example, is a broadband distribution network which is known from H. Hessenmüller et al., "Access Network Structures for Interactive Videoservices, " Part 1, Der Fernmeldeingenieur, Vol. 48, August 1994. An overview of broadband distribution networks is provided therein, which are also called BK [broadband cable] networks. In a higher-order BK repeater station, all television and radio programs are combined into a consistent program transmission and distributed to the user's BK repeater stations which are normally located in local exchanges. The television and radio programs are distributed in a downstream direction from the BK repeater stations to the subscribers.

A BK network of this kind represents a public network which terminates at tap devices which are also identified as in-house tap points. One or more subscriber terminals can be connected by means of a private, in-house network to each tap device, which are normally located in one building.

In order to create the possibility of interactive services, i.e., so-called Service-on-Demand (SoD) services, such as Video-on-Demand (VoD), in a BK network, in addition to the unidirectional services in the downstream direction (television and radio signals), return channels for signal transmission are provided in the upstream direction in a BK network. Thus, subscribers can send useful data to the SoD processing center, for example, to request information. The subscriber terminals have supplemental devices for interactive services; these supplemental devices are also called Set-Top Boxes.

A frequency range of about 5–30 MHz is specified for the return channels (upstream signals) and a frequency range about 40–300 MHz (450 MHz, hyperband) is specified for the television and radio signals (downstream signals) for existing BK networks.

The private, in-house network is exposed to numerous interferences, which are caused, for example, by shortwave radio transmitters, amateur radios and electric machines. In addition, the cables of the in-house network are sometimes designed without regard for such sources of interference. The upstream signals, in particular, are disturbed by these interferences. This problem is known, e.g., from N. De Muynck et al., "CATV-cables, they can do more!", International Television Symposium, Montreux, Switzerland, Jun. 15, 1991, pp. 179–195.

SUMMARY OF THE INVENTION

Due to a combination of high-pass and low-pass filters, the upstream signals with a high signal level can be kept from interfering with the downstream signals. This should also prevent the interferences superimposed on the upstream signals in the in-house network, that is, within the building, from disrupting or even interrupting the transmission.

The invention is based on the problem of defining a transmission system in which upstream signals can be received and evaluated by a center, even though the upstream signals in private, in-house networks have superimposed interference. Such a transmission system is a center connected to a distribution network having a plurality of tap devices each connected to the distribution network by a first port, and wherein subscriber terminals can be connected to each of the tap devices via a second port, the subscriber terminals being capable of receiving signals from the center and transmitting upstream signals to the center, characterized in that each of the tap devices comprises first means which attenuate an upstream signal applied to the second port by a fixed attenuation factor and transfer it to the first port, and that the upstream signal applied to the second port has a level which is chosen so that after the attenuation, the upstream signal has a level fixed in the distribution network.

A further task of the invention is a tap device for a transmission system wherein a center is connected to a distribution network to which the tap device is connected via a first port, and wherein subscriber terminals can be connected to the tap device via a second port, the subscriber terminals being capable of receiving signals from the center and transmitting upstream signals to the center, characterized in that the tap device comprises first means which attenuate an upstream signal applied to the second port by a fixed attenuation factor and transfer it to the first port, and that the upstream signal applied to the second port has a level which is chosen so that after the attenuation, the upstream signal has a level fixed in the distribution network.

A still further task of the present invention is a device for the direction-dependent attenuation of signals, with a first port and a second port through which the device is insertable into a line, with first means which attenuate an upstream signal applied to the second port by a fixed attenuation factor and transfer it to the first port, and with second means which transfer a first signal feedable into the first port to the second port, so that the device has a direction-dependent attenuation.

One advantage of the invention is that the tap device is a passive device, so that no power supply is needed at the location of the tap device. In addition, it has the advantage in that the tap device can be adapted to local conditions, e.g., to the size of the local interference level, without significant expense.

BRIEF DESCRIPTION OF THE DRAWINGS

The invention will be explained in greater detail below based on the figures. We have.

BEST MODE FOR CARRYING OUT THE INVENTION

Figure 1:
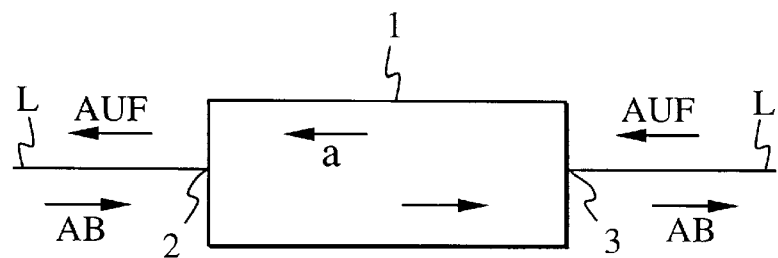
FIG. 1: A basic diagram of a device for directional attenuation of signals.

FIG. 1 shows a basic diagram of a device 1 for directional attenuation of signals, in order to explain the basic idea of the invention. Relative to this, the use of such a device 1 for directional attenuation of signals in a transmission system is explained. The device 1 has two ports 2, 3 to be used to insert the device 1 into a line segment L. In a transmission system according to FIG. 3, as will be explained below, the line segment L is a transmission path, preferably a coaxial cable.

A signal can be sent to port 2 and, in the description below, it is called the downstream signal AB. Also, a signal can be sent to port 3, which is called the upstream signal AUF. According to basic idea of the invention, the downstream signal AB is sent preferably unattenuated to port 3, and the upstream signal AUF is sent to port 2 attenuated by a specified attenuation factor "a". As a clarification, FIG. 1 indicates the direction of propagation of the upstream and downstream signals, AUF and AB, using arrows.

Figure 2:
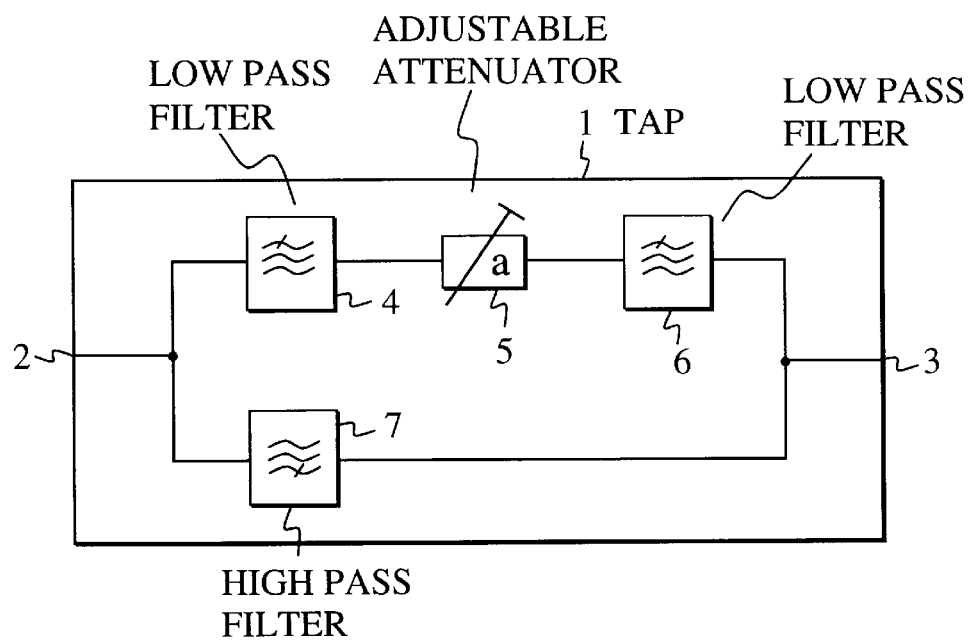
FIG. 2: A block diagram of the device shown in FIG. 1 for directional attenuation of signals.

FIG. 2 presents a block diagram of the device 1 shown in FIG. 1 for directional attenuation of signals. In a first branch, which is connected on one end to port 2 and by the second end to port 3, there are frequency-selective elements, preferably two low-pass filters 4, 6, which are part of a network separator, and an adjustable attenuator 5 connected in series. Instead of the two low-pass filters 4, 6, it is also possible to insert a single low-pass filter into the first branch. In a second branch, which is connected in parallel with the first branch and therefore is likewise connected to the two ports 2, 3, there is a high-pass filter 7 which is a part of a network separator.

In the transmission system mentioned above (FIG. 3), the upstream signal AUF and the downstream signal AB usually occupy different frequency ranges: The downstream signal AB (television and radio signals) has frequencies in the range between 40–300 MHz (450 MHz, hyperband) and the upstream signal AUF has frequencies in the range of 5–30 MHz. The high-pass filter 7 is designed so that the frequency range of the downstream signal AB is allowed to pass with nearly no attenuation; however, the frequency range of the upstream signal AUF is blocked. The low-pass filters 4, 6 are designed so that the frequency range of the upstream signal AUF is allowed to pass and the frequency range of the downstream signal AB is blocked. In accordance with the requirements on filters 4, 5, 7 with regard to their filter characteristics (e.g., limit frequencies and network selecting cutoff), filters with the appropriate accuracy should be selected. The selection and design of appropriate filters are known to ordinary persons skilled in the art.

The device 1 for directional attenuation of signals can be used extensively, e.g., wherever a directional attenuation of signals is needed. This may be the case, for example, within circuit arrangements or in transmission systems. The location where the device 1 is inserted for directional attenuation of signals can be different, on a case-by-case basis.

Figure 3:
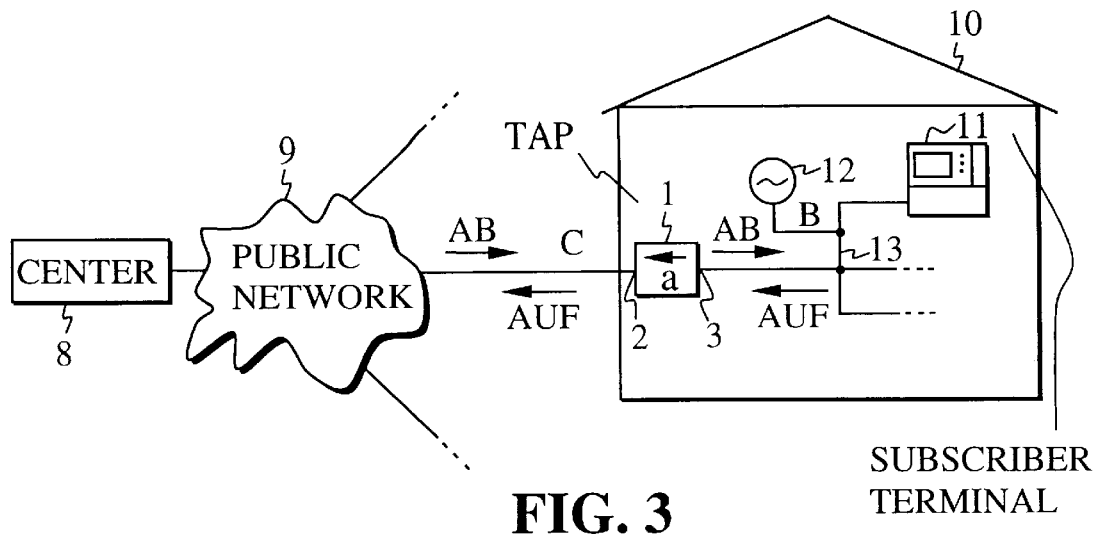
FIG. 3: A transmission system with a tap device located in a building.

FIG. 3 presents a schematic of the transmission system in which the device 1 for attenuation of signals forms a terminal of a public network 9, i.e., the device 1 for attenuation of signals represents a tap device (also called an "in-house tap point") located in a building 10, to which a private, in-house network 13 is connected. Thus, in the description of the transmission system, the device 1 for attenuation of signals is designated below as a tap device for which the same reference numerals are used. Subscriber terminals 11 (e.g., television and radio equipment in connection with devices for interactive services), which have the potential for transmission of upstream signals, can be connected to the private, in-house network 13.

A center 8 is connected to the public network 9, which may be a broadband distribution network designed for interactive services, for example. FIG. 3 shows only one building 10 with one tap device 1; however, it is self-evident that a number of tap devices 1 are connected to the public network 9.

The subscriber terminals 11 can send upstream signals AUF to the center 8. Since an upstream signal AUF is attenuated by a tap device 1 with the specified attenuation factor, e.g., 20 dB, then the signal level of the upstream signal AUF in the private, in-house network 13 is increased by an individually adjustable value. This takes place in that each subscriber terminal 11 emits upstream signals AUF with a signal level increased by a defined amount. This amount can be established individually for each building 10, depending on how great the interferences are. In the public network 9, the upstream signals after the attenuation again have a signal level specified for the public network 9 or are within a range specified for this, i.e., the upstream signals AUF have a higher signal level only where the interferences mentioned above can occur, namely, in the private, in-house network 13. No increase in signal level is necessary in the public network 9, since it is of more extensive design and is better maintained than the private, in-house network 13. To illustrate that the interferences occur in the building 10, FIG. 3 presents a source of interference 12 connected to the private, in-house network 13. The source of interference 12 is illustrated here as a source localized at one site, which ideally supplies the sum of all interferences.

Due to an increase in the signal level of the upstream signal AUF, when the level of the occurring interferences is unchanged, the signal-to-noise ratio is improved. The tap device 1, according to this invention, will ensure that interferences superimposed on an upstream signal AUF in the private, in-house network 13, will be attenuated, so that a dependable evaluation of the upstream signal AUF in the center 8 will be ensured. However, the tap device 1 will not prevent the interferences from being superimposed on an upstream signal AUF.

Figure 4:
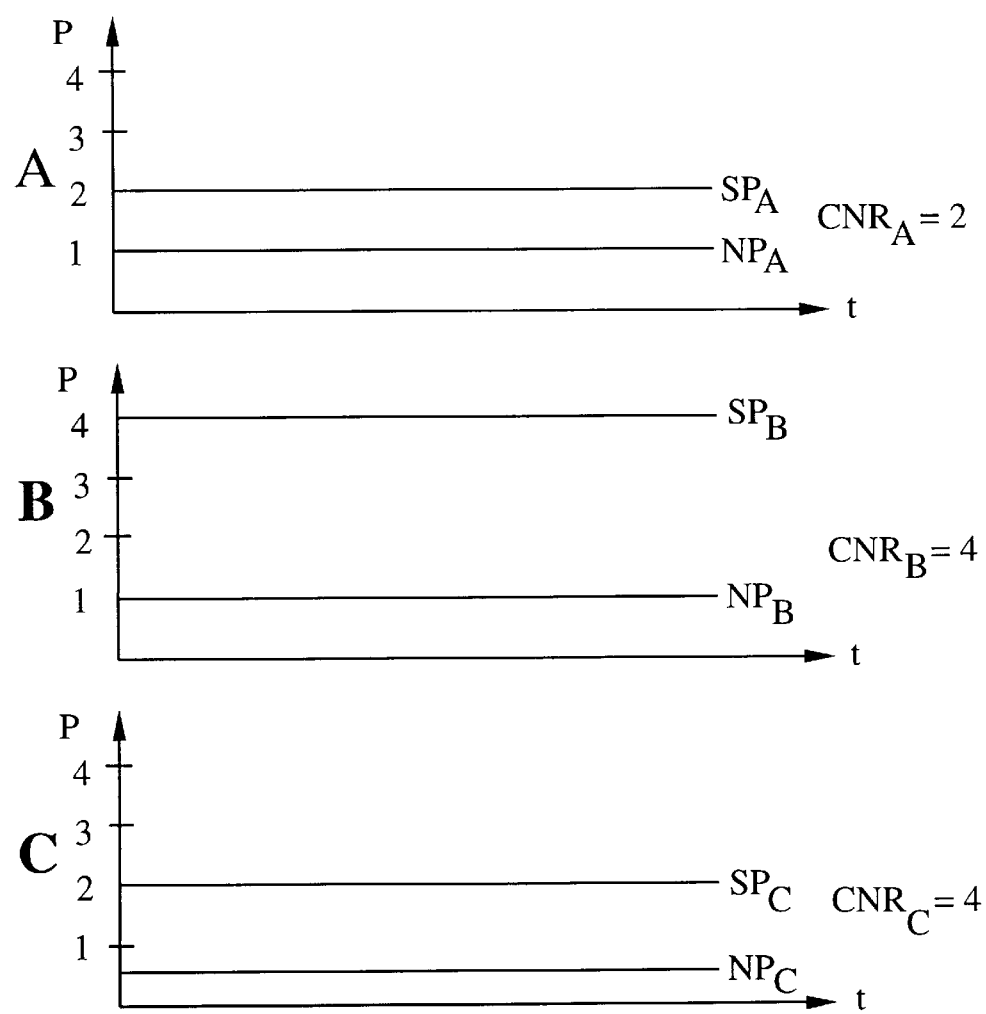
FIG. 4: Three diagrams showing medium signal and interference levels as a function of time.

FIG. 4 uses three diagrams to show the state of affairs in the preceding description, that is, the medium interference and signal level as an (ideal: constant) function of time t. The level P is plotted on the ordinate in standard units from 0 to 4. For a description of the diagrams A, B and C, the signal level has the reference numeral SP and the interference level has the reference numeral NP, each with an index to refer to the corresponding diagram. In diagram A, interference level $NP_A$ has level 1 and signal level $SP_A$ has level 2, and thus a signal-to-noise ratio $CNR_A=2$ will result. The levels shown in Diagram A correspond to a situation like that present without use of the invention.

In Diagram B, according to this invention, signal level $SP_B$ has been increased by a factor of 2 to a level of 4; the interference level $NP_B$ is unchanged. Thus, in this case, there is a signal-to-noise ratio $CNR_B=4$, that is, $CNR_A<CNR_B$. In FIG. 3 a "B" is placed in front of the tap device in the private, in-house network 13 to indicate that the upstream signal AUF at this point has the signal-to-noise ratio $CNR_B$ illustrated in Diagram C (FIG. 4).

Diagram C is obtained from an attenuation of the level shown in Diagram B due to the tap device 1 (FIG. 3): signal level $SP_C$ again has level 2, and interference level $NP_C$ has level 0.5: signal-to-noise ratio $CNR_C=4$ is unchanged in comparison to Diagram B, that is, $CNR_B=CNR_C=4$. In FIG. 3, a "C" has been inserted in the public network 9 in front of the tap device 1, in order to indicate that the upstream signal AUF at this point has the signal-to-noise ratio $CNR_C$ illustrated in diagram C (FIG. 4).

Both the device 1 for directional attenuation of signals (FIGS. 1 and 2) and the tap device 1 (FIG. 3) can be adapted to the local conditions, that is, the used filters can be designed as plug-in modules, so that by merely replacing the modules, different frequency ranges can be blocked or allowed to pass. This may be necessary, for instance, when the frequency division of the upstream and downstream signals changes due to changes in frequency plan or due to modernization of the public network 9. We have already discussed the adjustment of the attenuator 5 shown in FIG. 2 to another attenuation factor. This attenuator 5 can also be designed as a plug-in module.

As an alternative to the plug-in modules, it is also possible to provide at least one additional, corresponding element with different properties, for each high-pass filter 7, low-pass filter 4, 6 and attenuator 5. Thus, by using a switch, one can establish different filter characteristics and attenuation factors in a very simple manner.

If necessary, due to the attenuation of the attenuator 5 (FIG. 2), it is possible to adjust this attenuation to attenuations and amplifications occurring in the public network and in the private, in-house network. This will allow a better and more interference-resistant transfer of signals in multiple access mode, while using types of modulation which have not be optimized specifically for occurring interferences.

What is claimed is:

1. A transmission system wherein a center (8) is connected to a distribution network (9) having a plurality of tap devices (1) each connected to the distribution network (9) by a first port (2), and wherein subscriber terminals (11) can be connected to each of the tap devices (1) via a second port (3), said subscriber terminals (11) being capable of receiving signals (AB) from the center (8) and transmitting upstream signals (AUF) to the center (8), characterized in that each of the tap devices (1) comprises first means (4, 5, 6) which attenuate an upstream information signal from the subscriber terminals (AUF) and unwanted interference applied to the second port (3) by a fixed attenuation factor (a) and transfer it to the first port (2), and that the upstream signal from the subscriber terminals (AUF) applied to the second port (3) has a predetermined level which is chosen so that after the attenuation, the upstream signal from the subscriber terminals (AUF) thereby has a lower level which is fixed in the distribution network (9), and the first means is comprised of a passive attenuator, and each tap device is connected to only one subscriber.

2. A transmission system as claimed in claim 1 wherein the signal (AB) from the center (8) has frequencies in a first frequency range, and wherein the upstream signal (AUF) has frequencies in a second frequency range different from the first frequency range.

3. A transmission system as claimed in claim 1 wherein the first means (4, 5, 6) are contained in a first branch having one end connected to the first port (2) and a second end connected to the second port (3), and wherein a second means (7), which transfers a first signal feedable into the first port to the second port, is contained in a second branch which is connected in parallel with the first branch and is also connected to the two ports (2, 3).

4. A transmission system as claimed in claim 3 wherein the first means (4, 5, 6) comprise at least one low-pass filter (4, 6) and a variable attenuator (5) which pass and attenuate the upstream signal (AUF), and wherein the second means (7) comprise at least one high-pass filter which passes the signal (AB) from the center (8).

5. A transmission system as claimed in claim 3 wherein the first and second means (4, 5, 6; 7) are designed as replaceable plug-in modules.

6. A transmission system as claimed in claim 4 wherein the first and second means (4, 5, 6; 7) are each shunted by respective further means which are selectable by a switch.

7. A tap device (1) for a transmission system wherein a center (8) is connected to a distribution network (9) to which the tap device (1) is connected via a first port (2), and wherein subscriber terminals (11) can be connected to the tap device (1) via a second port (3), said subscriber terminals (11) being capable of receiving signals (AB) from the center (8) and transmitting upstream information signals from the subscriber terminals (AUF) to the center (8), characterized in that the tap device (1) comprises first means (4, 5, 6) which attenuate an upstream signal from the subscriber terminals (AUF) and unwanted interference applied to the second port (3) by a fixed attenuation factor (a) and transfer it to the first port (2), and that the upstream signal from the subscriber terminals (AUF) applied to the second port (3) has a predetermined level which is chosen so that after the attenuation, the upstream signal from the subscriber terminals (AUF) thereby has a lower level which is fixed in the distribution network (9), and the first means is comprised of a passive attenuator, and each tap device is connected to only one subscriber.

8. A device for the direction-dependent attenuation of signals, with a first port (2) and a second port (3) through which the device (1) is insertable into a line (L), with first means (4, 5, 6) which attenuate an upstream signal from a subscriber terminal (AUF) and unwanted interference applied to the second port (3) by a fixed attenuation factor (a) and transfer it to the first port (2), and with second means (7) which transfer a first signal (AB) feedable into the first port (2) to the second port (3), so that the device (1) has a direction-dependent attenuation.

* * * * *

UNITED STATES PATENT AND TRADEMARK OFFICE
CERTIFICATE OF CORRECTION

PATENT NO : 6,006,066
DATED : December 21, 1999
INVENTOR(S) : Krimmel

It is certified that error appears in the above-identified patent and that said Letters Patent is hereby corrected as shown below: On the title page, item:

[56] References Cited
FOREIGN PATENT DOCUMENTS
--3404525  6/1985  Germany-- should be added.

Signed and Sealed this

Sixth Day of March, 2001

Attest:

NICHOLAS P. GODICI

Attesting Officer

Acting Director of the United States Patent and Trademark Office